United States Patent Office 3,080,283
Patented Mar. 5, 1963

3,080,283
PHENAZINE DERIVATIVES FOR COMBATING NEMATODES
Johan Dirk Bijloo and Engbert Harmen Reerink, Weesp, Netherlands, assignors to North American Philips Company, Inc., New York, N.Y., a corporation of Delaware
No Drawing. Filed June 27, 1960, Ser. No. 38,744
Claims priority, application Netherlands Aug. 6, 1959
16 Claims. (Cl. 167—53)

It is known that many animals, for example cows, sheep, goats, pigs, horses and birds, may suffer from infections by worms and/or stages of development thereof. We may mention the harmful effects of infections by stages of lungworms in young cattle, such as calves, lambs, young pigs, foals, kids or chickens.

The present invention relates to a method of eliminating internal worms from domestic animals comprising administering to said animals an anthelmintic composition consisting essentially of at least one compound selected from the group consisting of the phenazine compounds of the formula

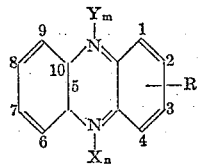

wherein X and Y are each selected from the group consisting of hydrogen, lower alkyl, phenyl and oxygen and R is a substituent attached to one of the ring carbons of the phenazine nucleus and selected from the group consisting of hydrogen, halogen, cyano, nitro, carboxymethylthio, lower alkyl and phenyl, $n$ and $m$ are each selected from the group consisting of 0 and 1 with the proviso that R is a substituent other than hydrogen when both $n$ and $m$ have the value 0, the pharmacologically acceptable salts thereof and the pharmacologically acceptable salts of phenazine.

In order to ascertain whether these compounds are effective against worms, use may be made of a test technique described by Leiper (Veterinary Record, 64, pages 438–439 (1952), ibidem 70, 273–277 (1958)). According to this method, the compounds to be examined are tested on the nematode *Turbatrix aceti*. Furthermore, the compounds can be tested in vitro on *Panagrellus redivivus*.

The activity of these compounds can also be proved in in-vivo tests. For example on guinea pigs artificially infected with *Dictyocaulus filaria*.

It should be noted that the following compounds, which come within the definition of the above-mentioned general formula, are known: 1-chloro-phenazine, 2-chloro-phenazine, 1,2-benzo-phenazine, 2,3-benzo-phenazine, 2-methyl-phenazine, 2-carboxy-methyl thio-phenazine, 1-nitro-phenazine, phenazine-5-oxide, 2-chloro-phenazine-5-oxide, 2-chloro-phenazine-5,10-dioxide, N,N'-dihydro-2,3-benzo-phenazine, N,N'-dihydrophenazine-2-nitrile-10-methyl.

The compounds according to the above mentioned formula can be produced according to methods described in the literature and on the analogy of the methods known for the production of the substances listed in the preceding paragraph.

In addition to the compounds mentioned specifically hereinbefore, the following substances also have the property of adversely affecting development stages of worms: 1-chloro-N,N'-dihydro-phenazine, 2- or 3-chloro-5-methyl-N,N'-dihydro-phenazine, 2-cyano-phenazine, 1-cyano-phenazine-5-oxide, 2-cyano-phenazine-5, 10-dioxide, 1-cyano-phenazine-5, 10-dioxide 1 - methyl-phenazine - 5 - oxide, 3-methyl-phenazine-5-oxide, 2-methyl-phenazine-5, 10-dioxide, 2-tertiary butyl-phenazine, 5-phenyl-N,N'-dihydro-phenazine, 5-(p-chloro)-phenyl - N,N' - dihydro-phenazine. From these compounds acid salts can generally be prepared, however, these salts generally hydrolize comparatively rapidly in water. Special mention should be made of the oxalate, dihydrochloride or the citrate of phenazine.

Of these compounds we may mention in particular those in which R is a hydrogen atom, a halogen atom or a alkyl group, none (except the case that R denotes a hydrogen atom) or one or both of the nitrogen atoms being bound to an oxygen atom. If R is a halogen atom, this preferably is a chlorine atom. If R is an alkyl group, this group preferably contains from 1 to 6 carbon atoms, especially a methyl group. Alternatively, the ring containing the two nitrogen atoms may be saturated. According to the general formula, examples of this special group of compounds are: 1- or 2-chloro-phenazine, 2-chloro-phenazine-5-oxide, phenazine-5-oxide, 2-chloro-phenazine-5, 10-dioxide, 2-methyl-phenazine, N,N'-dihydro-phenazine, 2-chloro-N,N'-dihydro-phenazine. These compounds are distinguished by a comparatively high activity.

It has also been found that the cyano-5-alkyl-N,N'-dihydro-phenazines, in particular 2-cyano-10-methyl compounds, have a comparatively great activity.

Of the benzo-phenazines particularly important compounds are those in which R is hydrogen, for example 1,2- or 2,3-benzo-phenazine and also N,N'-dihydro-2,3-benzo-phenazine.

The preparations in accordance with the invention can be produced according to methods known for the production of such preparations. The active compounds may be worked up into tablets, dragées, powders, capsules or granules or into injection liquids or dusting liquids.

The production of tablets preferably should start from the free bases or the neutral salts, since the acid salts, for example the hydrochloric acid or sulphuric acid salts, readily decompose unless they are stored at a pH of less than 4. In the production of the tablets, use may be made of the usual fillers and lubricants for facilitating the punching of the tablets. Furthermore, in manufacture substances may be used to promote the disintegration of the tablets in water. Suitable fillers are chalk, calcium phosphate, lactose or powdered sugar (saccharose), or mixtures thereof. In order to impart the required strength to the tablets, it may be desirable to use a mixture of lactose and powdered sugar, for example in a weight ratio between 1:1 and 4:1.

Powdered steatite (talc), magnesium stearate or calcium stearate may be used as lubricants. Known means for promoting the disintegration of the tablets in water are, for example, starches which swell in water, for example potato starch, corn starch or arrow root (*Amylum marantae*).

The dragées may be produced by coating tablets produced in the above mentioned manner with sugar by treating them with a sugar sirup in a coating drum.

In order to produce injection liquids, a compound of the Formula I can be suspended in distilled water with the addition of a dispersing agent. A suitable dispersing agent is commercially available under the trade name "Span" or "Tween," for example a polyoxyethylene sorbitan monolaurate (Atlas Powder Co.).

For the production of dusting liquids use may be advantageously made of the technique developed for the production of aerosols. These comprise a propellant, for example Freon, in which a solution or dispersion of the active substance to be dusted is dissolved or emulsified.

For combating worm infections, the tablets, powders, solutions or dispersions may be added to the food or the drinking water. The tablets, granules or capsules may also be administered orally. The dusting liquids may be dusted onto the food through inhalation apparatus. The injection liquids may be applied subcutaneously or intramuscularly. The amount of substance to be administered obviously depends upon the body weight of the animal to be treated, upon the activity of the compound and its tolerability. As a rule, however, from 0.1–100 mg. of the active compound can be satisfactorily tolerated per kg. of body weight of the patient.

*Examples*

(1) Finely ground 1-chloro-phenazine (particle size from 2–10μ) is poured, with the addition of polyoxyethylene sorbitane monolaurate (G 7596 J Atlas Powder Co.) in an amount of 15 mg. of dispersing agent per 40 mg. of 1-chloro-phenazine, into distilled water so that the final concentration of the active compound is 10%. After sterilization, the compound is ready for parenteral administration to animals.

(II) A mixture of 10 g. of 2-chloro-phenazine, 116 g. of milk powder, 60 g. of powdered sugar, 25 g. of potato starch was intimately mixed, finely powdered and then sifted through a 40-mesh sieve. The fine powder was evenly wetted with 20 ml. of a mixture of equal parts of water and 96% ethanol. The moist mass was rubbed through a 16-mesh sieve by hand, the granular mass being spread on plates and dried in an oven at a temperature of 40° C. The grains obtained were evenly mixed with a mixture of 12 g. of talc and 2 g. of magnesium stearate, the mixture subsequently being sieved through a 40-mesh sieve. This granulate was worked up into tablets in a tabletting machine.

(III) Tablets obtained by the method of Example II which, however, contained phenazine-N-oxide as the active substance, were treated with a saccharose sirup in a coating drum. After drying and repeated treatment dragées were obtained.

(IV) 1,2-benzo-phenazine was solubilized in a mixture comprising 80% of distilled water, 15% of propylene glycol and 5% of the emulsifier mentioned in Example I. The liquid was sterilized and then was ready for parenteral administration to animals.

(V) In the manner described in Example I, 2-chloro-phenazine-5-oxide was worked into an injection liquid.

(VI) In the manner described in Example II, 1-chloro-phenazine was worked into tablets.

What is claimed is:

1. A method of eliminating internal worms from domestic animals comprising administering to said animals an anthelmintic composition consisting essentially of at least one compound selected from the group consisting of the phenazine compounds of the formula

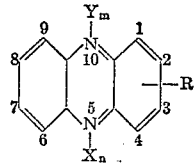

wherein X and Y are each selected from the group consisting of hydrogen, lower alkyl, phenyl and oxygen and R is a substituent attached to one of the ring carbons of the phenazine nucleus and selected from the group consisting of hydrogen, halogen, cyano, nitro, carboxymethylthio, lower alkyl and phenyl, $n$ and $m$ are each selected from the group consisting of 0 and 1 with the proviso that R is a substituent other than hydrogen when both $n$ and $m$ have the value 0, the pharmacologically acceptable salts thereof and the pharmacologically acceptable salts of phenazine.

2. The method of claim 1 when the phenazine compound is a cyano-5-alkyl-N,N'-dehydrophenazine.
3. The method of claim 1 when the phenazine compound is 1-chlorophenazine.
4. The method of claim 1 when the phenazine compound is 1,2-benzophenazine.
5. The method of claim 1 when the phenazine compound is 2,3-benzophenazine.
6. The method of claim 1 when the phenazine compound is 2-methyl-phenazine.
7. The method of claim 1 when the phenazine compound is 2-carboxymethylthiophenazine.
8. The method of claim 1 when the phenazine compound is 1-nitro-phenazine.
9. The method of claim 1 when the phenazine compound is phenazine-5-oxide.
10. The method of claim 1 when the phenazine compound is 3-chlorophenazine-5-oxide.
11. The method of claim 1 when the phenazine compound is 2-chloro-phenazine-5,10-dioxide.
12. The method of claim 1 when the phenazine compound is N,N'-dihydro-2,3 benzo-phenazine.
13. The method of claim 1 when the phenazine compound is 2-nitrile-10-methyl-N,N'-dihydrophenazine.
14. The method of claim 1 when the phenazine compound is phenazine-oxalate.
15. The method of claim 1 when the phenazine compound is phenazine-dihydrochloride.
16. The method of claim 1 when the phenazine compound is phenazine-citrate.

References Cited in the file of this patent
UNITED STATES PATENTS

| 2,292,808 | Waterman | Aug. 11, 1942 |
| 2,891,062 | Ursprung | June 16, 1959 |
| 2,986,493 | Overeem | May 30, 1961 |

OTHER REFERENCES

Encyclopaedia Britannica, vol. 16, 1957, pages 206–208.
Levine: Chem. Abs., 48 (1954), 10936(d).
Vivian: J.A.C.S., vol. 78, January 1951, pages 457–8.